United States Patent
Tengler et al.

(10) Patent No.: US 7,437,232 B2
(45) Date of Patent: Oct. 14, 2008

(54) VEHICLE AND METHOD FOR SPEED CONTROL BASED ON POSITION INFORMATION OF OTHER VEHICLES

(75) Inventors: Steve Tengler, Grosse Pointe Park, MI (US); Ron Heft, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 763 days.

(21) Appl. No.: 11/094,319

(22) Filed: Mar. 31, 2005

(65) Prior Publication Data

US 2006/0224295 A1    Oct. 5, 2006

(51) Int. Cl.
*B60T 7/12* (2006.01)

(52) U.S. Cl. .......................... 701/96; 180/179

(58) Field of Classification Search ................... 701/33, 701/36, 93, 96, 25, 300, 301; 180/170–179; 340/435–439
See application file for complete search history.

(56) References Cited

U.S. PATENT DOCUMENTS

| 6,990,401 | B2 * | 1/2006 | Neiss et al. ................... 701/96 |
| 7,103,460 | B1 * | 9/2006 | Breed ........................... 701/29 |
| 7,132,976 | B2 * | 11/2006 | Shinoda et al. ............... 342/70 |

\* cited by examiner

*Primary Examiner*—Richard M. Camby
(74) *Attorney, Agent, or Firm*—Foley & Lardner LLP

(57) ABSTRACT

An apparatus and method for controlling a speed of a vehicle includes detecting whether a cruise control setting of a first vehicle is active and receiving, at the first vehicle, position information of a second vehicle, the position information of the second vehicle including an elevation of the second vehicle. A value is determined that is representative of a difference in elevation between the first vehicle and the second vehicle based on the received position information of the second vehicle and an elevation of the first vehicle. A speed setting of the first vehicle is adjusted based on the determined value if the detected cruise control setting of the first vehicle is active.

24 Claims, 2 Drawing Sheets

VEHICLE AND METHOD FOR SPEED CONTROL BASED ON POSITION INFORMATION OF OTHER VEHICLES

FIELD OF THE INVENTION

The present invention relates generally to motor vehicles and, more particularly, to a vehicle and method for controlling vehicle speed based on position information of other vehicles.

BACKGROUND OF THE INVENTION

The vast majority of currently manufactured vehicles include a cruise control system that enables a driver to maintain a set speed without manual adjustment of the throttle or brake pedals. The cruise control system is generally reactive by nature. In particular, upon recognition of a speed error, the cruise control system attempts to correct for the speed error by increasing or decreasing the throttle. Since the cruise control system is unable to predict an increase or decrease in loading, it must react to variations from the desired speed and adjust the throttle accordingly. This reactive nature creates a system latency, i.e., a delay in adjusting the throttle to changes in loading. The system latency results in a larger response to the recognized speed error, which diminishes fuel economy. In addition, when traveling on a significant decline, such as going down a hill, the vehicle may accelerate past the set speed due to the pull of gravity. This accelerated speed can require the driver to intervene, such as by applying the brake. Similarly, when traveling on a significant incline, such as going up a hill, the vehicle typically drops below the set speed, increases the throttle to get back to the set speed, but then accelerates past the set speed at the top of the hill, creating another non-optimum condition.

SUMMARY OF THE INVENTION

It would be desirable to have a cruise control system that can diminish or avoid the system latency and correspondingly improve fuel efficiency.

According to an aspect of the invention, a vehicle and a method for controlling a speed of a vehicle includes detecting whether a cruise control setting of a first vehicle is active and receiving, at the first vehicle, position information of a second vehicle, the position information of the second vehicle including an elevation of the second vehicle. A value is determined that is representative of a difference in elevation between the first vehicle and the second vehicle based on the received position information of the second vehicle and an elevation of the first vehicle. A speed setting of the first vehicle is adjusted based on the determined value if the detected cruise control setting of the first vehicle is active.

Further features, aspects and advantages of the present invention will become apparent from the detailed description of preferred embodiments that follows, when considered together with the accompanying figures of drawings.

DETAILED DESCRIPTION OF PREFERRED EMBODIMENTS

Wireless communication between vehicles and to and from other structures and devices can provide for a significant increase in the amount and types of information available to vehicles and drivers, as well as the potential for a variety of new applications and systems ranging from crash avoidance to Internet entertainment systems. Systems such as telephony and Dedicated Short Range Communications (DSRC)) are capable of supporting wireless communication between vehicles. For example, using a DSRC system, each vehicle is capable of generating and broadcasting a "Common Message Set" (CMS), which provides each vehicle's relevant kinematical and location information such as GPS/vehicle position including longitude, latitude, elevation, velocity, vehicular dimensions, and other related information. The DSRC system can broadcast messages between vehicles using a frequency between about 5 and 6 GHz.

The CMS message can be broadcast as the most frequent message on the control or center channel of the DSRC band, although other messages can also be broadcast over this channel. Unicast messages (i.e., single-sender speaking directly to a single-receiver for mono-to-mono exchanges) can be directed to an alternate channel, and several channels can be designated as either urgent/safety-related channels or service-providing, non-urgent channels. This type of implementation permits OEM's to send messages only to vehicles of the same manufacturer or make, and create exchanges of information between them outside the central channel of communication.

Figure 1:
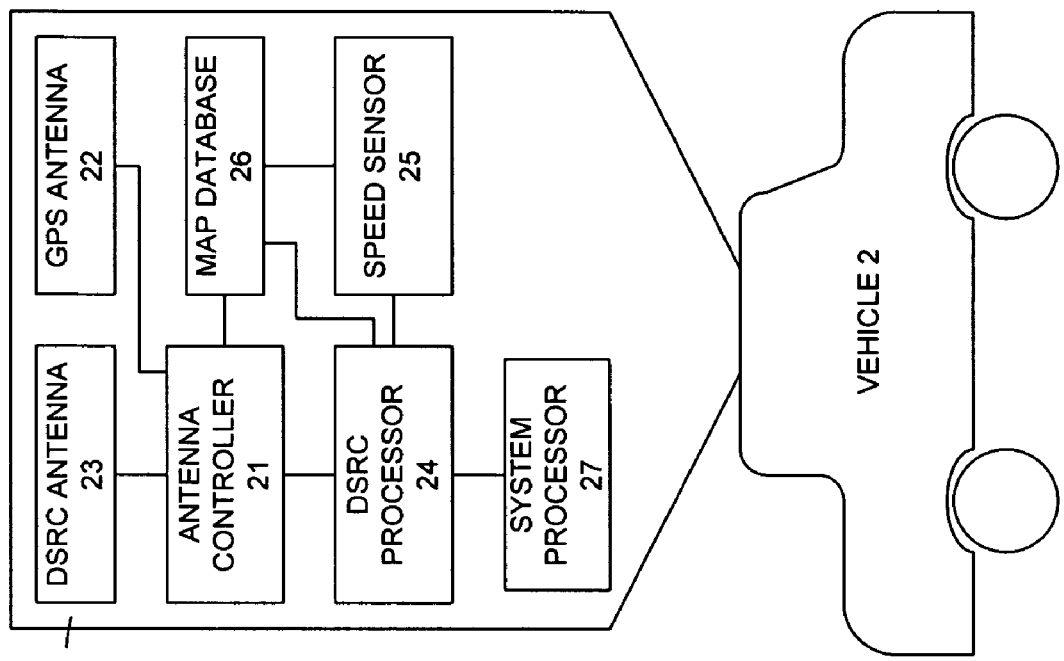
FIG. 1 is a block diagram of a cruise control system consistent with the present invention.
Figure 1:
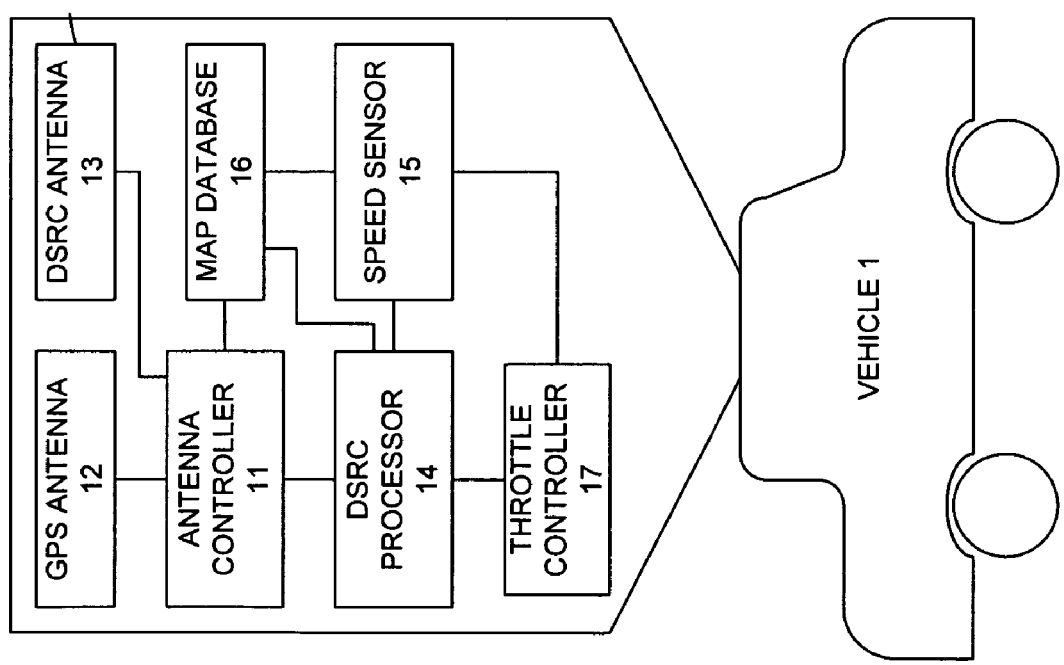

In view of this ability for information to be communicated between vehicles, it is possible to configure a system that enables a vehicle to modify its operation or settings and to notify a driver of settings, situations or conditions relevant to operating a vehicle. For example, it is possible to use information about the location of vehicles to adjust the cruise control setting of another vehicle. FIG. 1 is a block diagram of a cruise control system consistent with the present invention. As shown in FIG. 1, there is a vehicle 1 and a vehicle 2. The vehicle 1 includes an antenna controller 11, a GPS antenna 12, a DSRC antenna 13, a DSRC processor 14, a speed sensor 15, a map database 16, and a throttle controller 17. The vehicle 2 has similar elements including an antenna controller 21, a GPS antenna 22, a DSRC antenna 23, a DSRC processor 24, a speed sensor 25, a map database 26, and a system processor 27. Although only the two vehicles 1 and 2 are shown, it should be understood that the cruise control system is applicable to more than two vehicles.

The antenna controller 11 controls the functioning of both the GPS antenna 12 and the DSRC antenna 13. The GPS antenna 12 is configured to receive information to determine the location of the vehicle 1. The DSRC antenna 13 is configured to receive information from other vehicles and devices and to transmit information from the vehicle 1. The received information and the transmitted information can include, for example, kinematical and location information such as GPS/vehicle position, velocity, and vehicular dimensions, as well as status information, such as headlight status (ON/OFF, high brights, etc.), cruise control (ON/OFF) and other settable functions of a vehicle. The vehicle position, based on the GPS, preferably includes a longitude and latitude position, as well as the elevation of the vehicle. The received information can be transmitted and received in a predetermined message format such as the CMS. The predetermined message format may be unique to each manufacturer or be a common format for all vehicles. Even in the common format, the predetermined message may include a section or component identifying the manufacturer, which can enable a vehicle to send a message exclusively to other vehicles of the same manufacturer or make.

To transmit a message or other information, the DSRC antenna 13 receives control instructions from the antenna controller 11 and transmits the message in accordance with the control instructions. Messages or other information received by the GPS antenna 12 and the DSRC antenna 13 are provided to the antenna controller 11. In response to the received message, the antenna controller 11 can provide new control instructions to the DSRC antenna 13 based on the content of the received message. In addition, the antenna controller provides the received message to the DSRC processor 14.

The DSRC processor 14 is configured to process messages provided from the antenna controller 11 and to generate messages to be transmitted by the DSRC antenna 13. The DSRC processor 14 is also configured to control the setting of the throttle controller 17 in accordance with the speed sensor 15, the map database 16, messages received from via the DSRC antenna 13, and a speed setting set by a driver when the cruise control function is active. The DSRC processor 14 can include a processing unit, such as a CPU or microprocessor, a non-volatile storage medium, such as an NVRAM or ROM, and a volatile storage medium, such as RAM. The non-volatile storage preferably includes instructions executed by the processing unit to perform the message processing and generation and other control functions, as will be described in more detail herein.

The speed sensor 15 is configured to detect the traveling speed or velocity of the vehicle 1. The speed sensor 15 can be implemented as any of a number of speed detecting sensors as are known to those skilled in the art. The speed sensor 15 generates an electrical signal indicative of the speed of the vehicle 1 and provides the signal to the DSRC processor 14, the map database 16, and the throttle controller 17.

The map database 16 holds data indicative of the position or location of roadways that can be traveled upon by the vehicle 1. The map database 16 can be implemented in a non-volatile memory, such as a hard disk driver (HDD), a flash memory, a DVD, etc. The map database 16 may be changeable to update for changes to the roadway or for different geographical locations. For example, the map database 16 for one country may be implemented on one DVD and on another DVD for another country. Data from the map database 16 corresponding to the location of the vehicle 1 can be included in any messages composed by the DSRC processor 14 and transmitted by the DSRC antenna 13.

The throttle controller 17 controls the activity or position of the throttle. The control of the throttle is set in accordance with a control signal. The control signal is preferably generated by the DSRC processor 14 based on the speed of the vehicle 1 detected by the speed sensor 15, information from the map database 16, messages received from the DSRC antenna 13, and the speed setting set by a driver when the cruise control function is active. When the cruise control function is active, the control signal received by the throttle controller 17 is set so that the vehicle 1 maintains a speed as close to the speed setting as possible.

The components of the vehicle 2 are implemented and operate in the same manner as the corresponding components of the vehicle 1. In particular, the antenna controller 21, the GPS antenna 22, the DSRC antenna 23, the DSRC processor 24, the speed sensor 25, and the map database 26 are implemented and operate in the same manner as the antenna controller 11, the GPS antenna 12, the DSRC antenna 13, the DSRC processor 14, the speed sensor 15, and the map database 16, respectively. The system processor 27, like the DSRC processor 24, is preferably configured to include a processing unit, a non-volatile storage medium, and a volatile storage medium, such as RAM. The system processor 27 can be configured to perform functions for the vehicle 2 that are not performed by the DSRC processor 24.

Figure 2:
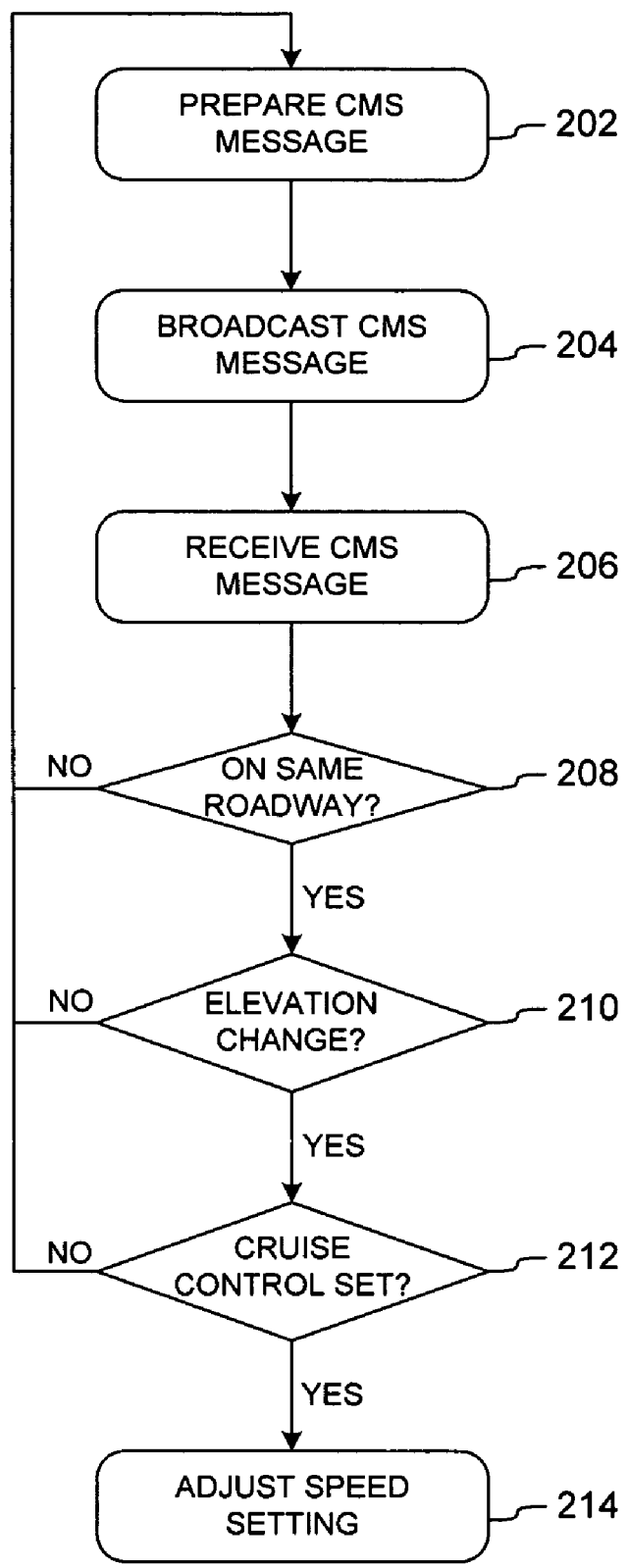
FIG. 2 is a flow diagram of a cruise control process consistent with the present invention.

FIG. 2 is a flow diagram of a cruise control process consistent with the present invention. In the following description, the process is described in conjunction with the vehicles 1 and 2 of FIG. 1. More specifically, the process is described from the standpoint of a message being transmitted from vehicle 2 and received by vehicle 1, which responds to the received message. It should be understood, however, that the process is applicable to any vehicle capable of communicating wirelessly with other vehicles.

As shown in FIG. 2, in the cruise control process, the vehicle 2 first prepares a CMS message (step 202). As described above, the CMS message can include kinematical and location information such as GPS/vehicle position (including latitude, longitude, and elevation), velocity, and vehicular dimensions, as well as other status information. With reference to FIG. 1, the DSRC processor 24 of the vehicle 2 collects the information for forming the CMS message. The information collected includes, for example, velocity data from the speed sensor 25, location information from the GPS antenna 22 and/or the map database 26, and other relevant information about the operation and settings of the vehicle 2. The collected information is formatted into the CMS message format. Although the CMS message format is preferable, other message formats, either common to all automobile manufacturers or unique to particular manufacturers can be used instead. Further, in addition to the collected information, the message is formatted to include a unique identifier for the vehicle 2 so that other vehicles receiving the message can distinguish the origin of the message from messages received from other vehicles. The CMS message can be prepared at predetermined time intervals, such as every minute.

The vehicle 2 broadcasts the CMS message (step 204). To broadcast the message, the DSRC processor 24 provides the CMS message to the antenna controller 21, which controls the DSRC antenna 23 to broadcast the message. The CMS message is broadcast at least to vehicles in the vicinity of the vehicle 2. Additionally, the CMS message can be broadcast to other structures, such as antenna towers or other communication devices, which can forward or broadcast the CMS message to more vehicles that may be outside of the broadcast range of the DSRC antenna 23.

The vehicles in the broadcast range of the DSRC antenna 23, including the vehicle 1, receive the CMS message from the vehicle 2 (step 206). At vehicle 1, the CMS message is received by the DSRC antenna 13 and provided to the antenna controller 11, which transfers the message to the DSRC processor 14. The DSRC processor 14 is configured to understand the format and content of the received CMS message and to process it accordingly.

The received CMS message includes an identifier of the vehicle transmitting the CMS message, in this case vehicle 2. The identifier enables the DSRC processor 14 to distinguish which vehicle sent the CMS message and to collect the most up-to-date information about each vehicle transmitting CMS messages to the vehicle 1. The information from the CMS messages can be stored in a memory coupled to or implemented in the DSRC processor 14. When a new CMS message is received, the DSRC processor 14 can update the information stored in the memory or, if it is the first CMS message received from a vehicle, store all of the information in the memory. The information can be stored, for example, in the form of a spreadsheet or table with a line for each vehicle, each line having the identifier of the vehicle and some or all of the information in the CMS message. Accordingly, for each vehicle sending a CMS message to the vehicle 1, the DSRC processor 14 may store each vehicle's location, speed, dimensions and other status settings.

In response to the received CMS message, the DSRC processor 14 determines if the CMS message indicates that the vehicle 2 is traveling on the same road as the vehicle 1 (step 208). To determine if the two vehicles are traveling on the same road, the DSRC processor 14 uses the location information of the vehicle 1 derived from the GPS data received by the GPS antenna and the location information (GPS data and/or data from map database 26) of the vehicle 2 from the received CMS message. The location each vehicle is used as an input to the map database 16. Based on the location of each vehicle in reference to the map database 16, it is possible to determine if both vehicles are traveling on the same road. In addition to determining if the vehicles are on the same road, the reference to the map database 16 can also be used to determine if the vehicle 2 is ahead of or behind the vehicle 1.

If the two vehicles are not on the same road, then the DSRC processor 14 can check if information is already stored for the vehicle 2 and update any new information. If the DSRC processor 14 determines that both vehicles are on the same road, then it checks to determine if there is an elevation change (step 210). The elevation change corresponds to any difference in elevation between the vehicle 1 and the vehicle 2. In the case of vehicle 1, it can determine its elevation from the GPS data received via the GPS antenna 12 and the elevation of the vehicle 2 from the CMS message transmitted by the vehicle 2. Almost invariably, there will be some elevation difference between the two vehicles. Accordingly, when checking to determine if there is an elevation change, the DSRC processor 14 may determine that there is an elevation change only if the difference in elevation between the vehicle 1 and the vehicle 2 is greater than some threshold, such as a two feet difference in elevation or a 3% grade differential.

In addition to checking if the vehicle 1 is on the same roadway as the vehicle 2 and whether there is an elevation change, the DSRC processor 14 determines whether the cruise control of the vehicle 1 is set or active (step 212). A driver can activate the cruise control by, for example, pressing a button or moving a switch to an on position. When the cruise control is active, the driver sets a cruising speed or speed setting in a similar manner, e.g., pressing a button or moving a switch. In addition, while traveling at the cruising speed is set, the driver can manually increase or decrease the speed setting. To determine if the cruise control is active, the DSRC processor 14 can be configured to receive a signal indicating that the cruise control is active, such as at the time the driver activates the cruise control. Alternatively, the DSRC processor 14 can be configured to monitor various status settings including the cruise control setting of the vehicle 1, such as those that may be included in the CMS message.

If the cruise control is not set or active, then no action is taken. If the cruise control is active, then the DSRC processor 14 adjusts the speed setting of the vehicle 1 (step 214). In general, the speed setting is changed in accordance with the elevation change between the vehicle 1 and the vehicle 2. In particular, an elevation difference is indicative that the vehicle 1 is approaching an incline or decline in the roadway. By recognizing the upcoming change in elevation, the DSRC processor 14 can increase the speed setting if the vehicle 1 is approaching an incline and decrease the speed setting if the vehicle 1 is approaching a decline. By adjusting the speed setting ahead of the change in elevation, the cruise control system acts proactively instead of reactively and can avoid overspeed conditions while traveling on a decline or reaching the crest of an incline, as well as avoid underspeed conditions while traveling on an incline. In general, when approaching an incline, a small increase is made to the speed setting, which decreases the overall deviation from the set speed. Similarly, when approaching a decline, a small decrease is made to the speed setting, causing the vehicle 1 to coast into the decline. In both situations, the proactive adjustment to the speed setting can result in increased system stability, improved fuel economy, avoidance of overspeed conditions, and decreased system drop-outs (i.e., deactivation of the cruise control) that result from significant underspeed conditions.

More preferably, to adjust the speed setting, the DSRC processor 14 takes into account the elevation change between the vehicle 1 and the vehicle 2, as well as the location and distance between them. The distance between the two vehicles can be calculated based on the GPS data of each vehicle. In general, the distance between the two vehicles has an inversely proportional effect on the adjustment to the speed setting, e.g., the greater the distance, the smaller the adjustment. The location takes into account the position of the two vehicles relative to each other. If the vehicle 2 is behind the vehicle 1, then the CMS message from the vehicle 2 is not useful in helping the vehicle 1 adjust its speed setting because the vehicle 1 has already passed the location of the vehicle 2. On the other hand, if the vehicle 2 is ahead of the vehicle 1, then the elevation difference between the two vehicles is relevant to the speed setting of the vehicle 1.

Even more preferably, the DSRC processor can use a formula, such as equation (1), to calculate how to adjust the speed setting of the vehicle 1:

$$SS^{r2} = SS^{r1} + C(E_2 - E_1)/D, \tag{1}$$

where $SS^{r2}$ is an adjusted speed setting, $SS^{r1}$ is a current speed setting, C is a calibration constant, $E_1$ is the elevation of the vehicle 1, $E_2$ is the elevation of the vehicle 2, and D is the distance between the vehicle 1 and the vehicle 2. As shown in equation (1), if the elevation $E_2$ of the vehicle 2 is greater than the elevation $E_1$ of the vehicle 1 (i.e., the vehicle 2 is at a higher elevation than the vehicle 1), then the adjusted speed setting $SS^{r2}$ is made greater than the current speed setting $SS^{r1}$, and vise versa. In addition, as the distance D between the two vehicles increases, the adjustment to the current speed setting $SS^{r1}$ decreases, and vise versa.

In equation (1), the adjustment to the speed setting is made based on the elevation difference between the vehicle 1 and only one other vehicle, i.e., vehicle 2. It is also possible to receive CMS messages from multiple vehicles and take into account their elevation and distance information when calculating the adjustment to the speed setting. Equation (2) provides an example of a formula for calculating how to adjust the speed setting of the vehicle 1 based on the elevation and distance information of multiple vehicles:

$$SS^{r2} = SS^{r1} + (C/n)\{\Sigma(E_n - E_1)/D_n^2\}, \tag{2}$$

where $SS^{r2}$ is the adjusted speed setting, $SS^{r1}$ is the current speed setting, C is the calibration constant, n is a count of the number of plurality of vehicles, $E_1$ is the elevation of the vehicle, $E_n$ is the elevation of a respective one of the plurality of vehicles, and $D_n$ is the distance between the vehicle and a respective one of the plurality of vehicles. In the formula of equation (2), vehicles that are closer to the vehicle 1 have a greater impact on the calculated adjustment to the speed setting than vehicles that are farther away.

In accordance with the present invention, a vehicle using cruise control can have the speed setting adjusted automatically in response to messages received from other vehicles. In particular, each received message comprises location information of the vehicle, the location information including the elevation of the vehicle. If the vehicle transmitting the message is traveling on the same road and is ahead of the vehicle receiving the message, then the vehicle receiving the message determines the elevation difference and distance between the vehicles. In accordance with the determined elevation difference and distance, the vehicle adjusts the speed setting. In general, when the vehicle is at a higher elevation than the vehicle transmitting the message, the speed setting is decreased, and vise versa. In this manner, the cruise control system of the vehicle can operate proactively to take into account information about changes in elevation before reaching those changes. As a result, the vehicle can be maintained closer to the set speed at all times regardless of elevation changes, and the fuel economy of the vehicle can be improved.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments (which can be practiced separately or in combination) were chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method for controlling a speed of a vehicle, comprising:
    detecting whether a cruise control setting of a first vehicle is active;
    receiving, at the first vehicle, position information of a second vehicle, the position information of the second vehicle including an elevation of the second vehicle;
    determining a value representative of a difference in elevation between the first vehicle and the second vehicle based on the received position information of the second vehicle and an elevation of the first vehicle; and
    adjusting a speed setting of the first vehicle based on the determined value if the detected cruise control setting of the first vehicle is active.

2. A method according to claim 1, further comprising:
    determining a distance between the first vehicle and the second vehicle based on the position information of the second vehicle and a location of the first vehicle,
    wherein the speed setting of the first vehicle is adjusted in accordance with the determined distance.

3. A method according to claim 2, wherein the speed setting of the first vehicle is adjusted in accordance with the equation:

$$SS^{r2} = SS^{r1} + C(E_2 - E_1)/D,$$

where $SS^{r2}$ is an adjusted speed setting, $SS^{r1}$ is a current speed setting, C is a calibration constant, $E_1$ is the elevation of the first vehicle, $E_2$ is the elevation of the second vehicle, and D is the distance between the first vehicle and the second vehicle.

4. A method according to claim 1, further comprising:
    determining whether the first vehicle and the second vehicle are located on the same roadway,
    wherein the speed setting of the first vehicle is adjusted only if the first vehicle and the second vehicle are determined to be on the same roadway.

5. A method according to claim 1, further comprising:
    determining whether the first vehicle is positioned above or below the second vehicle based on the determined value;
    reducing the speed setting of the first vehicle if the first vehicle is determined to be above the second vehicle; and
    increasing the speed setting of the first vehicle if the first vehicle is determined to be below the second vehicle.

6. A method according to claim 1, further comprising:
    receiving, at the first vehicle, position information of a plurality of vehicles including the second vehicle, the position information of each of the plurality of vehicles including an elevation of the respective vehicle;
    determining a value representative of a difference in elevation between the first vehicle and each of the plurality of vehicles based on the received position information of the plurality of vehicles and the elevation of the first vehicle; and
    adjusting the speed setting of the first vehicle based on each of the determined values.

7. A method according to claim 6, further comprising:
    determining a distance between the first vehicle and each of the plurality of vehicles based on the position information of the plurality of vehicles and a location of the first vehicle,
    wherein the speed setting of the first vehicle is adjusted in accordance with the determined distances.

8. A method according to claim 7, wherein the speed setting of the first vehicle is adjusted in accordance with the equation:

$$SS^{r2} = SS^{r1} + (C/n)\{\Sigma(E_n - E_1)/D_n^2\},$$

where $SS^{r2}$ is an adjusted speed setting, $SS^{r1}$ is a current speed setting, C is a calibration constant, n is a count of the number of plurality of vehicles, $E_1$ is the elevation of the first vehicle, $E_n$ is the elevation of a respective one of the plurality of vehicles, and $D_n$ is the distance between the first vehicle and a respective one of the plurality of vehicles.

9. A method according to claim 1, wherein the position information is received wirelessly by the first vehicle from the second vehicle.

10. A method according to claim 9, wherein the position information is received in conformance with a Dedicated Short Range Communications standard.

11. A method according to claim 10, wherein the position information is received in a format operating at a frequency between approximately 5 and 6 GHz.

12. A method according to claim 1, wherein the second vehicle is located ahead of the first vehicle on the same roadway.

13. A vehicle, comprising:
    a cruise control unit that controls at least a throttle setting of the vehicle in accordance with a speed setting;
    a receiver that receives position information from a different vehicle, the position information including an elevation of the different vehicle;
    a cruise control adjustment circuit configured to determine a value representative of a difference in elevation between the vehicle and the different vehicle based on the received position information of the different vehicle and an elevation of the vehicle, and to adjust a speed setting of the vehicle based on the determined value if the cruise control unit is active.

14. A vehicle according to claim 13, wherein the cruise control adjustment circuit is further configured to determine a distance between the vehicle and the different vehicle based on the position information of the different vehicle and a location of the vehicle and to adjust the speed setting of the vehicle in accordance with the determined distance.

15. A vehicle according to claim 14, wherein the cruise control adjustment circuit is configured to adjust the speed setting of the vehicle in accordance with the equation:

$$SS^{t2}=SS^{t1}+C(E_2-E_1)/D,$$

where $SS^{t2}$ is an adjusted speed setting, $SS^{t1}$ is a current speed setting, C is a calibration constant, $E_1$ is the elevation of the vehicle, $E_2$ is the elevation of the different vehicle, and D is the distance between the vehicle and the different vehicle.

16. A vehicle according to claim 13, wherein the cruise control adjustment circuit is further configured to determine whether the vehicle and the different vehicle are located on the same roadway and to adjust the speed setting of the vehicle only if the vehicle and the different vehicle are determined to be on the same roadway.

17. A vehicle according to claim 13, wherein the cruise control adjustment circuit is further configured to:
determine whether the vehicle is positioned above or below the different vehicle based on the determined value;
reduce the speed setting of the vehicle if the vehicle is determined to be above the different vehicle; and
increase the speed setting of the vehicle if the vehicle is determined to be below the different vehicle.

18. A vehicle according to claim 13, wherein the receiver receives position information from a plurality of vehicles including the different vehicle, the position information of each of the plurality of vehicles including an elevation of the respective vehicle, and wherein the cruise control adjustment circuit is further configured to determine a value representative of a difference in elevation between the vehicle and each of the plurality of vehicles based on the received position information of the plurality of vehicles and the elevation of the vehicle and to adjust the speed setting of the vehicle based on each of the determined values.

19. A vehicle according to claim 18, wherein the cruise control adjustment circuit is further configured to determine a distance between the vehicle and each of the plurality of vehicles based on the position information of the plurality of vehicles and a location of the vehicle and to adjust the speed setting of the vehicle in accordance with the determined distances.

20. A vehicle according to claim 19, wherein the cruise control adjustment circuit is configured to adjust the speed setting of the vehicle in accordance with the equation:

$$SS^{t2}=SS^{t1}+(C/n)\{\Sigma(E_n-E_1)/D_n^2\},$$

where $SS^{t2}$ is an adjusted speed setting, $SS^{t1}$ is a current speed setting, C is a calibration constant, n is a count of the number of plurality of vehicles, $E_1$ is the elevation of the vehicle, $E_n$ is the elevation of a respective one of the plurality of vehicles, and $D_n$ is the distance between the vehicle and a respective one of the plurality of vehicles.

21. A vehicle according to claim 13, wherein the receiver receives the position information wirelessly from the different vehicle.

22. A vehicle according to claim 21, wherein the receiver receives the position information in conformance with a Dedicated Short Range Communications standard.

23. A vehicle according to claim 22, wherein the receiver receives the position information in a format operating at frequency between approximately 5 and 6 GHz.

24. A vehicle according to claim 13, wherein the different vehicle is located ahead of the vehicle on the same roadway.

* * * * *